3,075,781
BEARING SEAL
Gerald O. Atkinson, William H. Cline, Jr. and Robert A. Cunningham, Houston, Tex., assignors to Hughes Tool Company, Houston, Tex., a corporation of Delaware
Filed Feb. 10, 1958, Ser. No. 714,296
10 Claims. (Cl. 277—83)

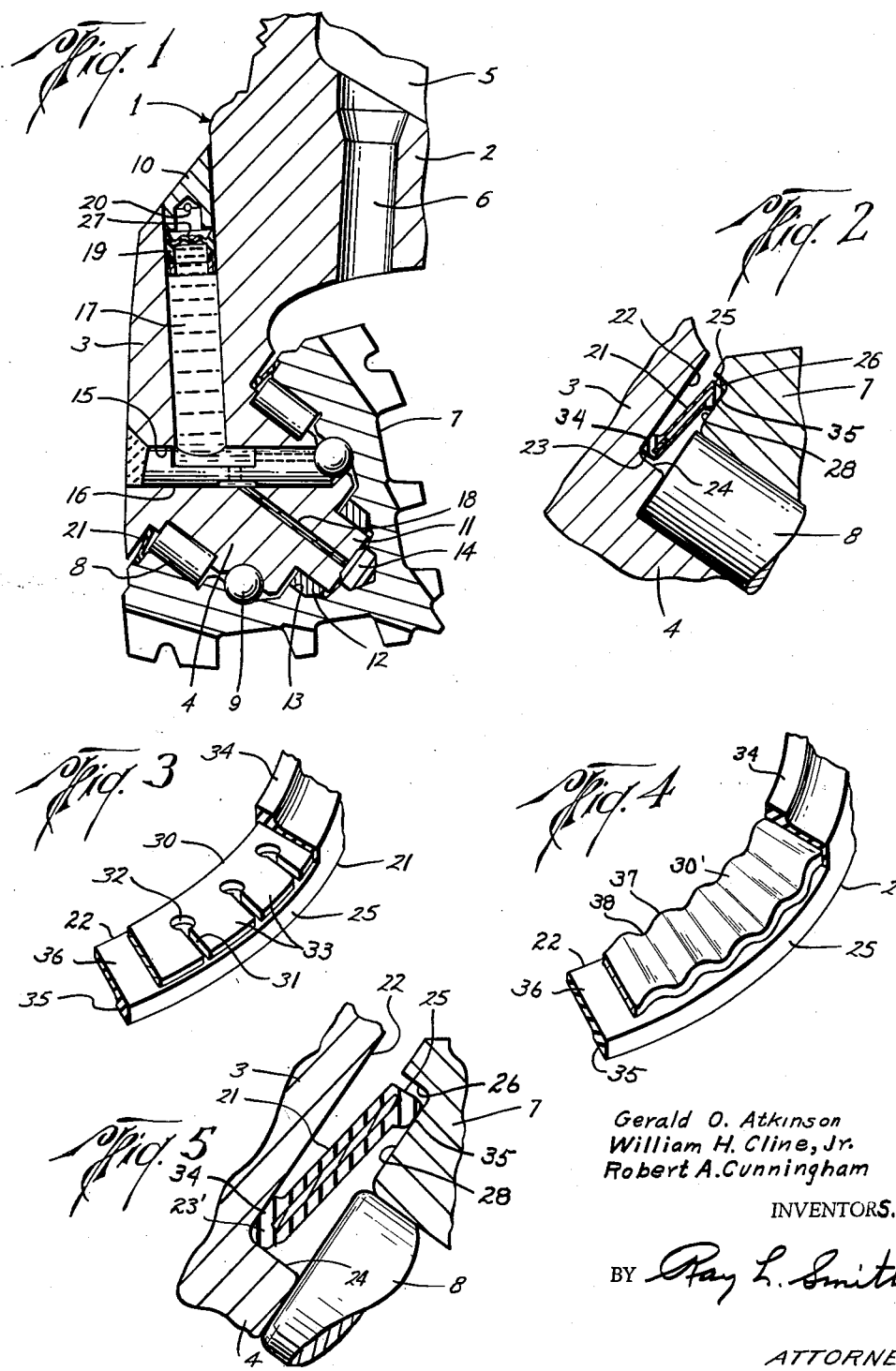
Gerald O. Atkinson
William H. Cline, Jr.
Robert A. Cunningham
INVENTORS.
BY *Ray L. Smith*
ATTORNEY United States Patent Office 3,075,781
Patented Jan. 29, 1963

This invention relates to a lubricant seal between two relatively rotatable parts and is of particular utility in retaining lubricant within a bearing, and excluding foreign material therefrom, where there is a combination of relative axial, radial, and wobbling movement.

The invention is of particular utility in earth boring drills of the rolling cutter type and is described herein as embodied in such a structure. It is to be understood, however, that the invention is not confined to such a particular structure but may be used in any environment wherein its superiority may be exploited.

Earth boring bits of the rolling cutter type conventionally have the cutters mounted on the spindles with interposed antifriction bearings to assume the loads imposed thereon in normal drilling operations. The bearing are filled with a lubricant at the time of assembly but, since these bits are usually run in an ambient of violently agitated flushing fluid which is either initially mud laden or becomes contaminated with cuttings, the lubricant is quickly contaminated and eventually is entirely displaced by the flushing fluid and abrasive materials contained therein. This leads to rapid deterioration of the bearing structure, which in turn decreases the effectiveness of the bit and its useful life.

It has been proposed to provide a lubricator for the bit to constantly add lubricant as that within the bearing leaks into the ambient. Also, it has been proposed to provide lubricant seals between the relatively rotating parts of the bit. These have not been successful, and it has been found that any contamination whatsoever of the lubricant is extremely undesirable.

It is therefore a primary object of the invention to provide a lubrication system which will assure the retention of adequate lubricant in a bearing at all times.

Another object is to provide a lubricant seal which will retain lubricant within the bearing and resist ingress of a contaminant to the bearing.

A further object is to provide a bearing lubricant seal which will maintain a seal between the relatively rotating parts even though the parts are subject to a composite movement of one part relative to the other.

Still another object is to provide between the relatively rotating parts an annular seal which is so constructed and arranged that it will follow all relative movements between the parts and thereby retain lubricant within the bearing and prevent entrance of a contaminant thereto.

The invention also comprehends an annular seal that floats freely within the space provided therefor and thereby effectuates the intended results above pointed out.

The foregoing objects and others will be apparent from the following description and the drawings in which:

FIG. 1 is a sectional view through one of the cutter assemblies of a cone type bit embodying the invention;

FIG. 2 is an enlarged detail showing the lubricant seal and its relationship to the cutter and bit head between which it forms a seal;

FIG. 3 is a partial, cut-away view of one form of the seal ring of the invention;

FIG. 4 is a partial, cut-away view of a seal ring of modified form; and

FIG. 5 is an enlarged detail similar to that of FIG. 2 but showing the relationship of parts when the seal ring is used in a modified form.

As shown in FIG. 1 of the drawings the bit 1 comprises a bit head 2 having a plurality of downwardly extending legs, one of such legs being shown at 3. Each leg has an integral shaft 4 which extends inwardly and downwardly toward the axis of the bit. The head 2 has an internal chamber 5 at its upper end, from which flushing fluid is conducted downwardly through passageways 6 to and about the cutters, of which one is shown at 7, so that cooling of the bit and removal of the cuttings from bottom will be effected.

The cone cutter 7 is contoured internally and the shaft 4 is similarly contoured to provide raceways for roller bearings 8 and ball bearings 9, both of these bearings being adapted to assume loads radially of the shaft 4 and the latter also serving to assume loads axially of the shaft and hold the cutter on the shaft. The pilot pin 11 on the end of the shaft 4 fits within the bushing 12 pressed into the bore 13 in the cutter 7. A thrust button 14 secured in the cutter 7 bears against the end of the shaft 4 and assumes a portion of the outward thrust of the cutter when the bit is in operation. There are thus provided anti-friction bearings 8 and 9 to carry the major portion of the load placed upon the cutter 7 while the friction bearing between the pilot pin 11 and the cutter 7 carries the load at and proximate the axis of rotation of the bit. At the same time the ball bearings 9 assume axial loads on the cutter and the thrust button 14 assists in assuming the outward thrust loads on the cutter.

A bore 15 extends from the exterior of the leg 3 to a point in the ball race for the ball bearings 9. This construction enables positioning of the cutter 7 upon the shaft 4 with the roller bearings 8 in place. The balls 9 are then inserted through the bore 15 until the ball bearing 9 is complete. Pin 16 is then inserted in the bore 15 to hold the balls in their raceway. This pin is secured in place as by means of a deposit of weld metal in the end of the bore.

A supply of lubricant for the bearings, just described, is provided in the chamber 17 in the bit leg 3. The lower end of this chamber communicates with the bore 15 and cut away portions of the pin 16 so that lubricant may move relatively freely to or from the bearings. The lubricant passages include a bore 18 axially of the shaft 4 so that lubricant may also move freely to and from the thrust button 14 and the adjacent friction pilot pin bearing.

Lubricant within the chamber 17 is surmounted by a piston 19 slidable axially of the chamber. The upper end of the chamber is closed by a plug 10 suitably secured in place and having a breather opening 20 therein.

An important feature of the invention resides in the structure thus far described in combination with a seal ring 21 interposed between the surface 28 on the base of the cutter 7 and the inwardly facing shoulder 22 on the bit leg 3. It should be noted that the seal ring 21 is a continuous ring surrounding the end of the shaft 4 and, as will be more fully explained, is so constructed and arranged as to exert pressure upon and effect sealing engagement with each the surface 28 on the cutter 7 and the shoulder 22 on the bit leg 3.

Preferably the inner periphery 23 of the seal ring 21 is of such diameter that there is slight clearance between the ring and the periphery 24 of the shaft 4, as clearly seen in FIG. 2. Similarly, the outer periphery 25 of the seal ring 21 is of such diameter as to have radial clearance with the inwardly facing shoulder 26 at the base of the cutter 7. In other words, the seal ring 21 is so related to adjacent structure as to permit limited radial floating action to contribute to the maintenance of an adequate seal.

Earth boring bits are subjected to extreme stresses,

For example, it is not uncommon that a static load, or weight, of 40,000 pounds to 70,000 pounds be applied to a three cone bit 8¾" in diameter. Resulting stresses are augmented by impact stresses of high amplitude as bits often run "rough" especially when drilling hard formations. Such extreme conditions cause a complex movement of the cutter 7 relative to the shaft 4, and such movement is amplified as wear takes place. One component of movement is axially of the shaft. At the same time there is a wobbling movement of the cutter relative to the shaft. Hence, the seal ring 21 must be so constructed and arranged that it will follow every movement of the confronting surfaces of the bit head and the cutter.

Such relative movements may take place with extreme rapidity, and with each such movement there is a volumetric change in the space in the bearing occupied by the lubricant. For this reason passages for the lubricant must be of ample size to permit free flow thereof. Also the piston 19 should move downwardly freely. To further freely permit small high speed volumetric changes of lubricant in the bearings and to compensate for inertia of the piston 19, the head 27 of this piston is in the form of a flexible corrugated membrane.

The seal ring 21 is of special construction to provide a positive seal at all times and under all circumstances between the surfaces 22 and 28. The ring is generally in the form of a truncated cone, and must possess axial resiliency and a capability of following every movement of the cutter 7 relative to the bit leg 3. Details of seal rings are shown in FIGS. 3 and 4.

Each of the seal ring shown is a composite ring comprising an inner ring or core 30 and 30' (FIGS. 3 and 4) of steel or other resilient material in the form of a frustum of a cone. To facilitate variable axial displacement about its circumference the ring 30 is provided with radial slots 31 with circular openings 32 at their inner ends. Thus each finger 33 is capable of limited independent movement axially of the seal ring.

The inner ring 30 is encased in a suitable impervious material 36 and the ring and impervious material are preferably, though not necessarily, interbonded to provide a unitary structure. The ring is contoured exteriorly to provide oppositely axially extending annular ridges 34 and 35 at its inner and outer peripheries which engage and form radially spaced seals with the bit leg 3 and the cutter 7. As already indicated the material 36 must be of such nature as to be impervious to the adjacent liquids and must also be chemically inert to such liquids as well as capable of maintaining an effective seal with the surface engaged by it. Such a material is available, for example, in various of the oil resistant synthetic rubbers and plastics.

The form of seal ring shown in FIG. 4 is the same as that just described except that the inner ring 30' is deformed to form alternate ridges and grooves 37 and 38. This form of seal ring also possesses the necessary characteristics to maintain the desired seal between the surfaces 22 and 28.

The operation of the described embodiment is believed apparent from the foregoing description. By way of supplementation, we refer to the fact that it is desirable that the seal ring be so constructed and arranged within the space provided therefor that it have limited floating action within such space. That is to say, the seal ring is not anchored to either the cutter 7 or the leg 3 and may therefore move radially to a limited extent as it functions to maintain a continuous sealing contact between the annular ridges or beads 34 and 35 and the opposed surfaces 28 and 22 on the cutter and the bit leg.

Radial floating action of the ring 21 is maintained in the structure shown in FIG. 5 wherein the encasing material provides a bead 23' at the inner periphery of the ring, such bead extending radially inwardly and contacting the surface 24. As a general rule, the encasing material is relatively deformable, and in such case the bead 23' will deform sufficiently that the desired floating action results. Obviously such action may be selectively obtained, as desired, by dimensional control or compounding the bead portion 23' of a material having a greater or lesser resiliency than that of the remainder of the encasing material. When the invention assumes this form, it should be noted that a sufficiently higher pressure on the lubricant side of the seal ring will move the lip or ridge 35 outwardly and permit a small quantity of lubricant to escape. On the other hand a sufficiently higher pressure on the exterior of the seal ring may move the lip or ridge 34 from engagement with the surface 22. However, the bead 23' then serves to prevent entrance of a contaminant to the bearing. The seal ring thus serves as would a check valve to exclude contaminants.

While the seal ring 21 is shown as dished, or comprising the frustum of a cone, it is to be understood that this particular form is not imperative as the invention comprehends the use of a resilient seal ring so constructed and arranged as to be capable of effectively accomplishing its intended purposes even though there is a complex relative movement between the bearing parts.

The invention claimed is:

1. In a machine having a support member, a shaft extending transversely thereof, and a relatively rotatable member mounted on such shaft, there being opposed, generally radially extending annular surfaces on such members, an annular seal ring radially floatingly surrounding said shaft and generally coaxial therewith, said seal ring in relaxed position having the general form of a frusto-conical shell having a wall of elongated length in comparison with both its thickness and its axial height and being axially elastically flattenable to reduce such height, said seal ring having a pair of axially facing, radially spaced annular surfaces at its inner and outer peripheral portions, said surfaces facing in opposite directions and each in sliding and sealing engagement with one of the annular surfaces of said members, such engagement resulting from a partial flattening of said seal ring between and by the annular surfaces of said members.

2. In a machine having a support member, a shaft extending transversely thereof, and a relatively rotable member mounted on such shaft, there being opposed annular surfaces on such members extending generally radially with respect to said shaft: a face seal comprising an annular, axially elastically flattenable seal ring radially floatingly surrounding said shaft in generally coaxial relationship therewith and having a pair of axially facing, radially spaced annular surfaces at its inner and outer peripheral portions, said surfaces facing in opposite directions and each in sliding and sealing engagement with one of the annular surfaces of said members as a result of a partial flattening of said ring between the annular surfaces of said members, said seal ring comprising a core and a superposed coating of impervious rubberlike material thereon defining at least said annular surfaces of said seal ring in engagement with said annular surfaces of said members, said core in relaxed position having the general form of a frusto-conical shell having a wall with a length elongated in comparison with both its thickness and its axial height and being elastically flattenable under axial loading to reduce such height.

3. For use in an earth boring drill having a head, a downwardly extending leg thereon, a shaft integral with and extending inwardly from said leg, there being a shoulder at the junction of said leg and shaft presenting a radially extending surface, and a cutter rotatably mounted on such shaft and having a portion forming a radially extending surface in confronting spaced relation with such first mentioned surface: an improved seal comprising an axially elastically flattenable seal ring generally coaxially but radially floatingly surrounding said shaft between said confronting surfaces, said seal ring in relaxed position having the general form of a frustoconical shell having a wall elongated in length in comparison with both its thickness and its axial height, being elastically flattenable under axial compression to reduce such height, and having an axially facing, annular surface on each of its opposed top and bottom faces, said surfaces on the seal ring being radially spaced adjacent the diagonally opposed edges thereof and each being in sliding and sealing engagement with one of said confronting radially extending surfaces as a result of partial flattening between and by such surfaces in assembly.

4. A seal ring adapted to provide a seal between a pair of annular, generally radially extending surfaces on a pair of relatively rotatable members assembled so that such surfaces face one another to define an annular gap having a cross section in an axial plane with an elongated radial dimension and a short axial dimension, said seal ring consisting essentially of an elastic metal core with an elongated radial dimension and a short axial dimension, said core in relaxed position being slightly dished in the axial direction so that its total axial dimension exceeds that of the gap between said pair of radially extending surfaces, and an impervious, resilient, rubberlike coating on at least those portions of the upper and lower faces of said ring defining the upper and lower axial limits thereof, said ring and core being amenable to axial elastic compression or flattening when installed between said annular faces and said covering being adaptable to provide sealing and sliding engagement with both said surfaces.

5. The seal ring of claim 4 in which said elastic metal core is radially corrugated to form alternate ridges and grooves.

6. The seal ring of claim 4 which is also adaptable to provide sealing and sliding engagement with a generally cylindrical surface intersecting and integral with the generally radially extending surface of one of said members to define one radial extremity of said gap, in which said rubberlike resilient covering also extends over one edge of said core and is deformable to provide sealing and sliding engagement with said cylindrical surface.

7. The seal ring of claim 6 in which said elastic metal core is radially corrugated to form alternate ridges and grooves.

8. In a machine of the type described in claim 2, a face seal as therein claimed in which said core is radially corrugated to form alternate ridges and valleys in proceeding circumferentially.

9. In a machine of the type described in claim 2, a face seal as therein claimed in which said seal ring includes a radially extending deformable portion of said coating on its inner periphery in sliding and sealing engagement with said shaft.

10. In a machine of the type described in claim 9, a face seal as therein claimed in which said core is radially corrugated to form alternate ridges and grooves in proceeding circumferentially.

References Cited in the file of this patent

UNITED STATES PATENTS

| | | |
|---|---|---|
| 2,247,505 | Kohler | July 1, 1941 |
| 2,279,669 | Friskney | Apr. 14, 1942 |
| 2,365,065 | Frankenfield | Dec. 12, 1944 |
| 2,467,312 | Jack | Apr. 12, 1949 |
| 2,481,430 | Koller | Sept. 6, 1949 |
| 2,547,185 | Von Bolhar | Apr. 3, 1951 |
| 2,600,433 | Saywell | June 17, 1952 |
| 2,679,412 | Whitfield | May 25, 1954 |
| 2,814,465 | Green | Nov. 26, 1957 |

FOREIGN PATENTS

| | | |
|---|---|---|
| 1,132,266 | France | Oct. 29, 1956 |